Feb. 2, 1971  J. SCHMIDT ET AL  3,559,252
EXTRUSION APPARATUS

Filed Feb. 6, 1968  2 Sheets-Sheet 1

INVENTORS
JURGEN SCHMIDT
HANS GEORG NITZSCHE

ATTORNEYS

United States Patent Office 3,559,252
Patented Feb. 2, 1971

3,559,252
EXTRUSION APPARATUS
Jurgen Schmidt, Monchen-Gladbach, and Hans-Georg Nitzsche, Oeslau, Germany, assignors to Schneider & Co., Frechen/Cologne, Germany
Filed Feb. 6, 1968, Ser. No. 703,355
Int. Cl. B28b *3/26*
U.S. Cl. 25—17   5 Claims

ABSTRACT OF THE DISCLOSURE

Improved apparatus for the extrusion of articles having elongated cavities in them, including an array of parallel tubes removably mounted in a holding plate and having blocked downstream ends and lateral openings extending in the direction of extrusion. During extrusion, the clay or other material first passes through upstream parts of the tubes then, after having passed beyond the holding plate, passes through the lateral openings in the tubes, and then between the blocked downstream ends of the tubes. In accordance with the invention the tubes are retained in the holding plate by means of collars at their upstream ends, and the thickness of the plate is approximately equal to the distance between the collars and the lateral openings in the tubes.

---

The present invention relates to the production of extruded articles having elongated parallel cylindrical or prismatic cavities, for instance in a form similar to a honeycomb, and more especially to such articles made in this manner from ceramic material.

Ceramic articles with such a structure are often used in applications where low bulk density is required, as for example for heat insulation, or as catalyst carriers, owing to the large specific surface areas which such articles possess. The width of the cavities in these articles can vary within wide limits, for example, from about two hundredths of an inch to at least a quarter inch. The spacing of the cavities from one another is usually determined by the wall strength desired between the cavities. In actual constructions, the ceramic structures can be so arranged that in cross section the axes of their cavities are in a quincunx formation, or they can be stacked in checkerboard fashion.

In the production of such ceramic bodies the plastic clay or other similar material can be extruded by pressing it through a die made up of a number of parallel tubes which are mounted in a perforated plate at their upstream ends and which have their downstream ends plugged, the material being extruded flowing through holes in the tube walls and then between the downstream ends of the tubes. In practical applications, several hundred to several thousand tubes are necessary in each single apparatus, and both the manufacture of the perforated plate and the assembling of the tubes to it have been found to be difficult, since care must be taken not to apply excessive pressure to either. Since the production of tubes is only possible within certain tolerances, it is always likely that some tubes will not be attached to the plate with sufficient holding force and will be displaced by the working pressure applied to extrude the plastic material.

Practice has shown that especially in the case of extruded structures having cavities of very small dimensions and narrow or thin separating walls, very high pressures are required for extrusion, for instance about 300 atm. Thus, sufficient holding pressure or force cannot be applied to the tubes since it would cause their thin walls to be deformed. It is possible to braze or solder the tubes together and with the holding means used, this process will afford the die assembly sufficient stability as regards the extrusion pressure and satisfactory relative positioning of the tubes will be obtained however, this method of construction is difficult and complicated in actual practice because each individual tube must be treated with graphite paste, or else the tubes must be embedded in graphite powder or the like in order to ensure that their outlet ends and their bores do not take up spelter or solder, as the case may be, since this would obstruct the material to be extruded.

It is also found in connection with structures of the nature just described that it is very difficult to remove remnants of clay or the like from between the outlet openings of the tubes and from the small gaps between the tubes, which often have a breadth of only a few thousandths of an inch. Further, uneven wear of the tubes, occurring as a result of production tolerances, may make the whole die totally unuseable, even though only one tube is damaged. For these reasons there is a practical requirement for making it possible to remove and replace tubes in the die, both to facilitate freeing the die of residues of clay, and also to be able to replace worn or damaged tubes.

Since wear occurs particularly at the parts of the tubes near their outlet ends, at which the clay or other material to be extruded is caused to change its direction of flow, it has been previously proposed to construct the die in such a manner that the tube end of reduced diameter, through which the clay or other material emerges, forms a separate outlet head which can be screwed into the end of a smooth tube remote from the extruding piston. In such a construction, the smooth tubes may be connected with one another and with the holding means by an adhesive or by a suitable solder which fills up the spaces between the tubes and the holding means.

There are, however, definite limitations to such a construction, especially when the cavity size of the article to be produced is very small, for example, less than about one tenth of an inch. For one thing, when a screw-threaded connection is used, with the female thread on the tube and the male thread on the outlet head, a definite wall thickness has to be allowed. This means that the mass of material being extruded undergoes a considerable reduction in cross section, and this can lead to having the cavities around the outlet heads formed with discontinuities, so that flaws are found in the finished article. There is also the disadvantage that in time the threading and unthreading of the screw connections at the outlet heads leads to wear, especially in the case of small diameters, so that after a time a secure connection ceases to exist. Also, there is the constant problem that some of the threads will become stripped.

One object of the present invention is to improve the apparatus described above in such a manner that the disadvantages mentioned do not occur.

Generally stated, the present invention provides an apparatus for producing articles by extrusion which have elongated, parallel, adjacent cavities. The apparatus comprises to means for applying extruding pressure to the material to be extruded, a perforated plate disposed generally perpendicular to the axis of extrusion, and, mounted in the holes in the plate, extrusion tubes extending parallel to the direction of extrusion, wherein the tubes are blocked at their downstream ends and define passage which have upstream portions passing through the plate, then through holes in the walls of the tubes, and then between the locked downstream ends of the tubes. Also, the tubes carry collars on the upstream side of the plate, and the thickness of the plate is substantially equal to the distance along the tubes from the collars to the holes in the tube walls. As a result, the tubes can be removed in a simple manner from the perforated plate for the removal of clay residue and they can then be easily replaced or exchanged for new tubes if the original ones are excessively worn.

In accordance with a preferred feature of the invention the plate is made up of interconnected parallel adjacent bushings in which the tubes are fitted. The bushings can be connected by soldering, brazing, metal adhesive, or other means. The external diameter of these bushings controls the spacing of the tubes, and their inner diameters correspond to the outside diameters of the tubes. The tubes themselves can be in the form of commercially available tubes, which can be obtained with a diameter as small as about four thousandths of an inch and a wall thickness as thin as about four ten-thousandths.

One important advantage of the die means in accordance with the invention is that by changing the tubes in the perforated plate it is possible to change the wall thickness of the cavities in the articles produced, as well as changing the cross sectional size and shape of the cavities.

In accordance with a further feature of the invention, there is a removable limiting sleeve-like die component surrounding the tubes, which defines the outer shape of the material to be produced by extrusion. By replacing this sleeve-like component by another it is possible to change the cross sectional shape and size of the articles produced. The cross section of the passage formed by this sleeve-like component, through which the clay or the like can be extruded, is less than or equal to the area of the perforated plate.

In accordance with a further feature of the invention, plugs can be provided for blocking unwanted tubes or unwanted holes in the plate.

In accordance with a still further feature of the invention the apparatus comprises a blocking plate located on the upstream side of the perforated plate which blocks some of the holes in the plate. Securing bolt means extend through this blocking plate and are anchored to an anchor plate having a rim wall parallel to the direction of extrusion. If the blocking plate is placed to the center of the perforated plate, it is possible to produce articles with a central elongated cavity surrounded by a wall in which there are smaller elongated cavities.

Apparatus in accordance with the invention thus fulfills the practical requirement of allowing for easy removal of the tubes for cleaning the apparatus and for replacement if wear has taken place. There is also a secure mounting of the tubes so that they are not displaced by the extrusion pressure, for instance laterally owing to the use of the perforated plate with the thickness stipulated. Moreover, owing to the use of the plate and tubes which can be cheaply produced in automatic machinery, and of the sleeve-like die component, there is a considerably simpler holding means and it is easier to adapt the apparatus for a different production program.

Some embodiments of the invention are now described with reference to the accompanying drawings.

Figure 1:
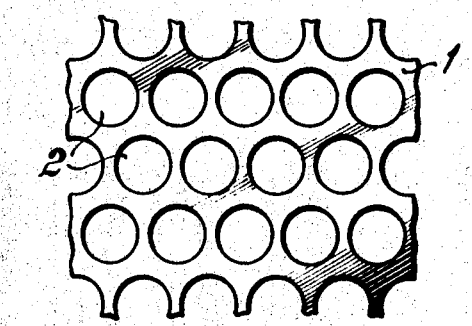
FIG. 1 is a fragmentary end view of part of an article with elongated cavities, that is to say, similar to a honeycomb.

As shown in FIG. 1, an article with elongated cavities of the type which can be produced by apparatus in accordance with the invention comprises a ceramic material 1, extruded in a plastic condition, and having a plurality of parallel cylindrical (or polygonal) cavities 2. The diameter of the cavities or ducts can be chosen from a wide range, for instance from a few thousandths of an inch to a quarter inch or more. The spacing of the cavities can also vary throughout the same general range, in accordance with the degree of strength required or the ratio of cavity cross section to total cross section. The number of cavities can be up to 10,000 in a single article.

Figure 2:
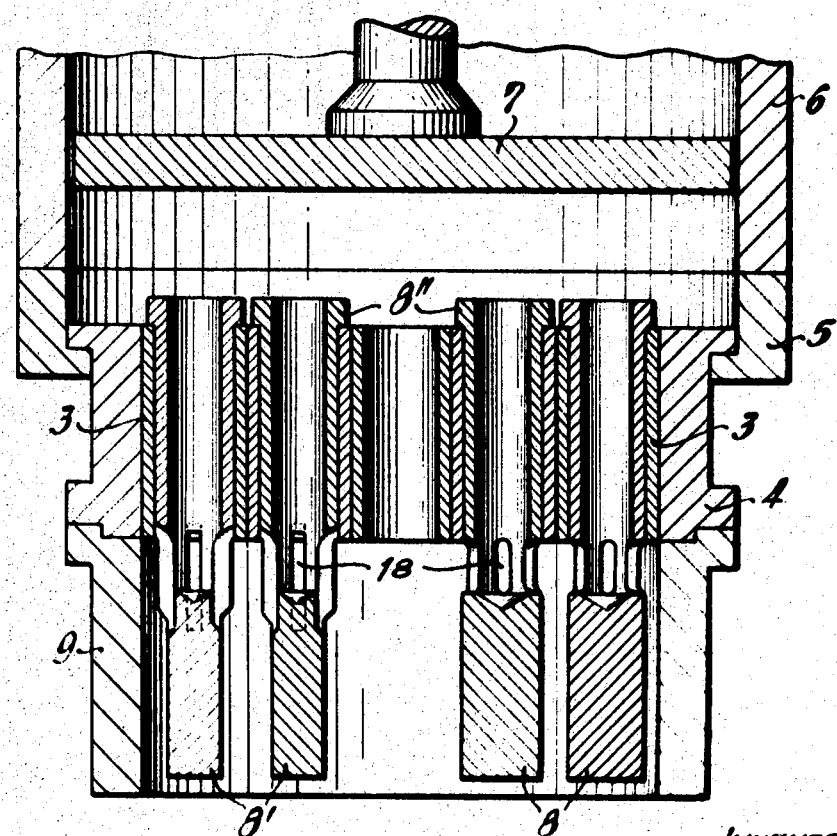
FIG. 2 is a fragmentary sectional elevation of an apparatus in accordance with the invention with two different types of extrusion tubes.

As shown in FIG. 2, a number of smooth bushings 3 are mounted in a holding means 4 and are connected to each other and also to the holding means by brazing, soldering, or metal adhesive, so that they collectively provide what may be referred to as a perforated plate having apertures whose diameters are equal to the inner diameters of the bushings 3. The perforated plate so formed is connected with the head plate 5 of an extrusion cylinder 6 having an extrusion piston 7 for providing the necessary extrusion pressure.

Extrusion tubes 8, 8' (FIG. 2) are inserted into and held in place by the bushings 3. The upstream ends of these tubes are provided with shoulders or collars 8", which prevent the tubes from being pushed through the bushings by the extrusion pressure. As illustrated, the tubes 8, 8' are closed at their downstream ends above which point the tubes define lateral openings 18, through which the extruded material passes out of the tubes. From the figures it can be seen that by removing the tubes 8 and replacing them with tubes 8', articles with different cavity cross sections can be produced on the same apparatus. It is also easily possible to remove one or more damaged tubes 8, 8' by pressing them in the upstream direction, following which they may if necessary be replaced with new extrusion tubes.

The outer periphery of an article made in accordance with the invention is delimited by a sleeve-like die component 9 which enshrouds the tubes 8 and extends downwardly about them to their bottom end extremities; in FIG. 2 this component is shown as extending somewhat below the ends of the tubes 8, but this is done in order to render the drawing more readily intelligible. As will be understood, the extruded material passing through the openings 18 in the tubes flows around the blocked lower extremities of the latter while confined by the component 9, to thereby define the form of the extruded article.

Figure 3:
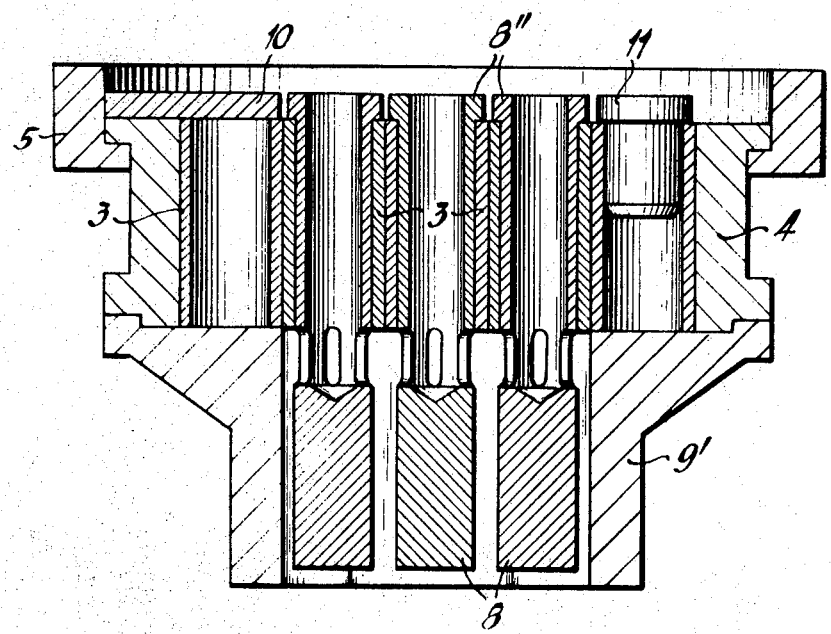
FIG. 3 is a sectional elevation showing the apparatus of FIG. 2 after replacement of the sleeve-like component by a different such component.

FIG. 3 is a cross section of the same basic apparatus as is seen in FIG. 2, but with a smaller sleeve-like die component 9' being used, which has a hexagonal bore for extrusion of an article having a hexagonal cross section. Also, two of the bushings 3 have no extrusion tubes inserted into them and are blocked at their top end, either by means of a plate 10 shown in the left-hand side of FIG. 3 or by means of a plug 11 shown in the right-hand side of the figure.

Figure 4:
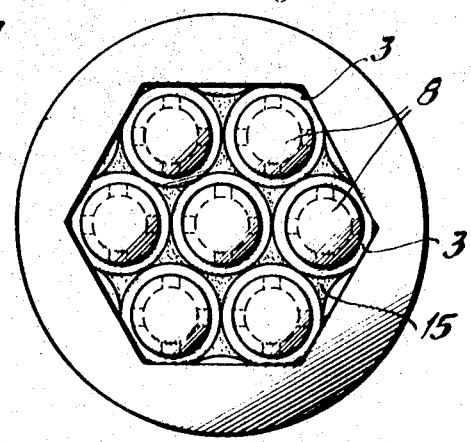
FIG. 4 is a bottom plan view of the apparatus shown in FIG. 3.

FIG. 4 is a bottom plan view of the apparatus in accordance with FIG. 3, there being the slight modification that the bushings 3 are not in contact with each other. The connecting material, such as spelter, solder or metal adhesive is denoted by reference numeral 15.

Figure 5:
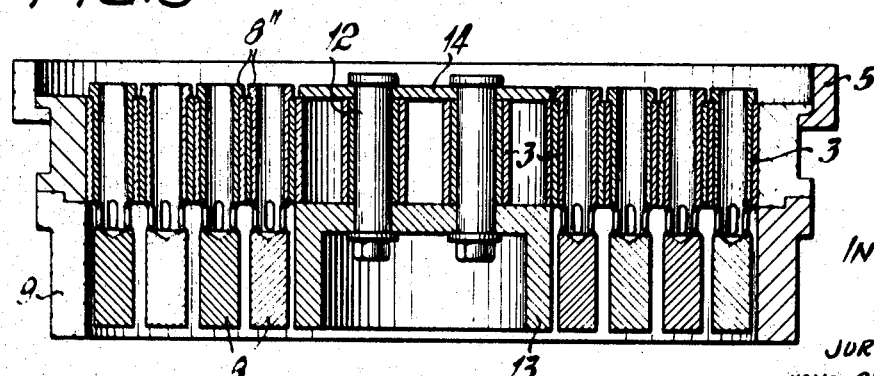
FIG. 5 is a sectional elevation showing an apparatus for the production of tubular bodies with elongated cavities in their walls.

FIG. 5 shows a further embodiment of an apparatus having the features of the invention for the production of tubular articles. In this case, the bushings 3 in the center of the apparatus are stopped by the centrally-arranged plate 14, which is connected by means of bolts 12 with an oppositely-placed anchoring plate 13 having a rim wall extending parallel to the direction of extrusion.

The apparatus in accordance with the invention is not only suitable for the production of articles with elongated cavities extruded from clay or the like which is fired subsequently, as has been described by way of example, but is also entirely suitable for the extrusion of other materials such as synthetic resins which cure after extrusion, or of clay or the like which is mixed with synthetic resin and which cures after extrusion.

The embodiments of the invention in which an exclusive property or privilege is claimed are defined as follows.

1. In an apparatus for producing by extrusion articles having elongated parallel adjacent cavities, of the type having means for applying extruding pressure to material to be extruded, a perforated plate means disposed generally perpendicular to the axis of extrusion, and extrusion tubes mounted in holes in such plate and extending parallel to the direction of extrusion, the improvement comprising means for blocking said tubes at their downstream ends; means defining passages in said tubes which have portions passing through said plate means, through the walls of the tubes, and between the blocked downstream ends of the tubes; and means for anchoring each of said tubes in place within said plate means; and said plate means comprising a plurality of interconnected parallel adjacent bushings in which the extrusion tubes are fitted.

2. An apparatus according to claim 1 further comprising a removable plug for blocking an unwanted hole in the plate.

3. An apparatus according to claim 1 further comprising a blocking plate on the upstream side of the perforated plate means, said plate blocking predetermined ones of the holes in the plate.

4. An apparatus according to claim 3, further including an anchor plate and securing bolt means extending through said blocking plate and said anchor plate, said anchor plate having a rim wall disposed parallel to the direction of extrusion.

5. An apparatus according to claim 1 further comprising a removable, limiting, sleeve-like die component surrounding at least the blocked end portions of said tubes, for defining the outer shape of the material to be produced by extrusion.

References Cited

UNITED STATES PATENTS

| | | | |
|---|---|---|---|
| 1,725,959 | 8/1929 | Heath | 25—17 |
| 1,829,431 | 3/1932 | Mayhew | 25—17 |
| 3,380,128 | 4/1968 | Cremer et al. | 25—17 |
| 3,406,435 | 10/1968 | Dretzsch | 25—17 |

CHARLES W. LANHAM, Primary Examiner

J. E. ROETHEL, Assistant Examiner